United States Patent [19]

Curry

[11] 4,144,923
[45] Mar. 20, 1979

[54] TIRE TREAD SIPING MACHINE
[76] Inventor: Kenneth D. Curry, P.O. Box 1856, Hattiesburg, Miss. 39401
[21] Appl. No.: 851,966
[22] Filed: Nov. 16, 1977
[51] Int. Cl.² .......................................... B29H 21/08
[52] U.S. Cl. ................................................. 157/13
[58] Field of Search ......................................... 157/13
[56] References Cited
U.S. PATENT DOCUMENTS

| | | | |
|---|---|---|---|
| 2,765,846 | 10/1956 | Ellis | 157/13 |
| 2,794,503 | 6/1957 | Kraft | 157/13 |
| 2,986,205 | 5/1961 | Okerstrom | 157/13 |
| 3,426,828 | 2/1969 | Neilsen | 157/13 |
| 3,498,356 | 3/1970 | Magers | 157/13 |

Primary Examiner—Al Lawrence Smith
Assistant Examiner—James G. Smith
Attorney, Agent, or Firm—William Anthony Drucker

[57] ABSTRACT

The present tire siping machine can rotatably support a wheel mounted and inflated tire with the tread thereof facing a driven and adjustably mounted siping blade and feeler adjustably connected to the siping blade for permitting the feeler and siping blade to engage the tire whereupon the feeler maintains the siping blade in proper relation to the tire tread for said siping blade to cut and move around the tire tread to effect minute lateral cuts or sipes in a section of the tire tread to be followed by repositioning of said blade to other sections of the tread and repetitions of the siping operation until the entire tire tread is siped.

9 Claims, 6 Drawing Figures

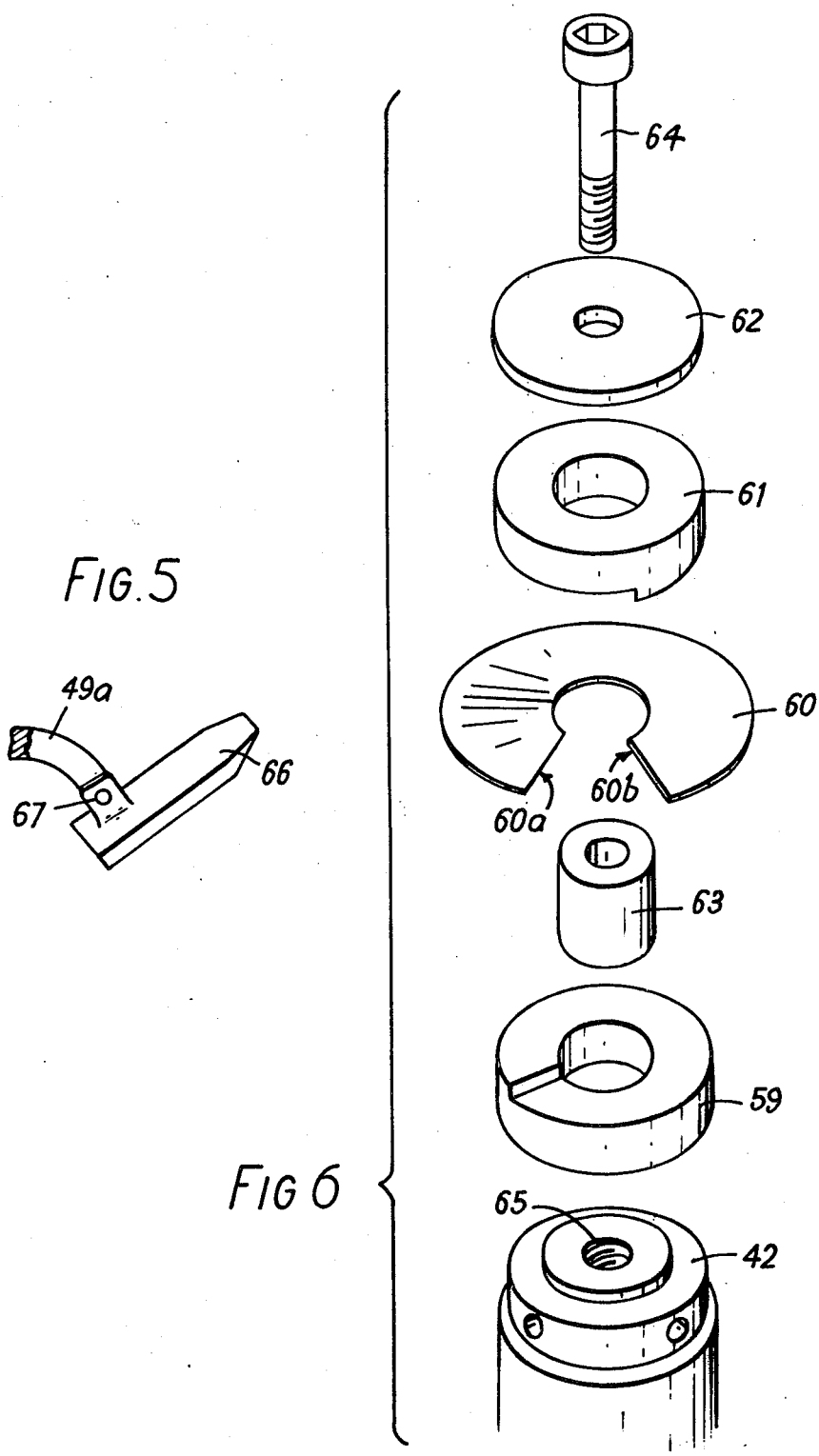

[Page number: 4,144,923]

TIRE TREAD SIPING MACHINE

The present invention is concerned with a machine for siping tires.

OBJECTS OF THE INVENTION

The principal object of the present invention is to provide a machine for rotatably supporting a wheel mounted and inflated tire and to effect a series of sipes in the entire circumference of the tire tread accurately and in a short period of time.

Further objects of the invention will be partly pointed out in and partly obvious from the following detailed description of the accompanying drawings.

BRIEF DESCRIPTION OF THE DRAWINGS

In the accompanying drawings:

FIG. 5 is a side elevation of an alternative form of feeler;

FIG. 6 is a perspective view, with the elements shown in axially separated condition, of a cutter head assembly.

DESCRIPTION OF THE PREFERRED EMBODIMENT

Figure 1:
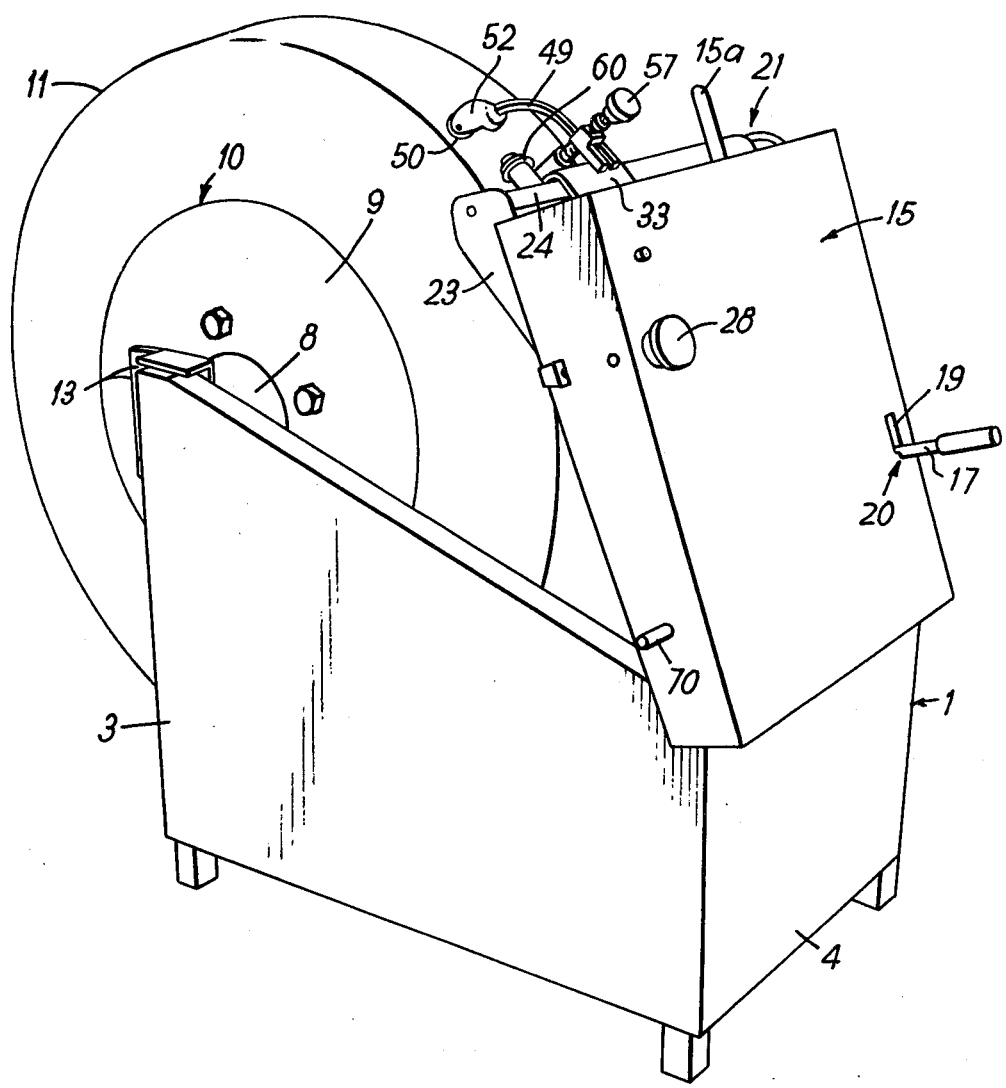
FIG. 1 is a perspective view of the tire siping machine.

The tire siping machine comprising a stationary support 1 having opposed spaced parallel side walls 2, 3, and a front wall 4, the rear end being open. Carried by the side walls 2, 3, adjacent the open end and at the upper part of the support there is provided a transverse shaft 5 which sits on blocks 6 so as to be readily removable and replaceable. The shaft 5 carries a frustoconical sleeve 7 which serves to receive and center a mandrel 8 bolted to the hub 9 of a vehicle wheel 10 having a tire 11. The mandrel is adjustable along the shaft 5 so that the wheel 10 may be positioned with its axial plane of symmetry X-X' substantially centrally in the support. The wheel and tire are freely rotatable. On the side walls 2, 3, there are provided flanges 12, 13, which are inclined so as to act as guide for facilitating insertion of the wheel into the support.

Figure 2:
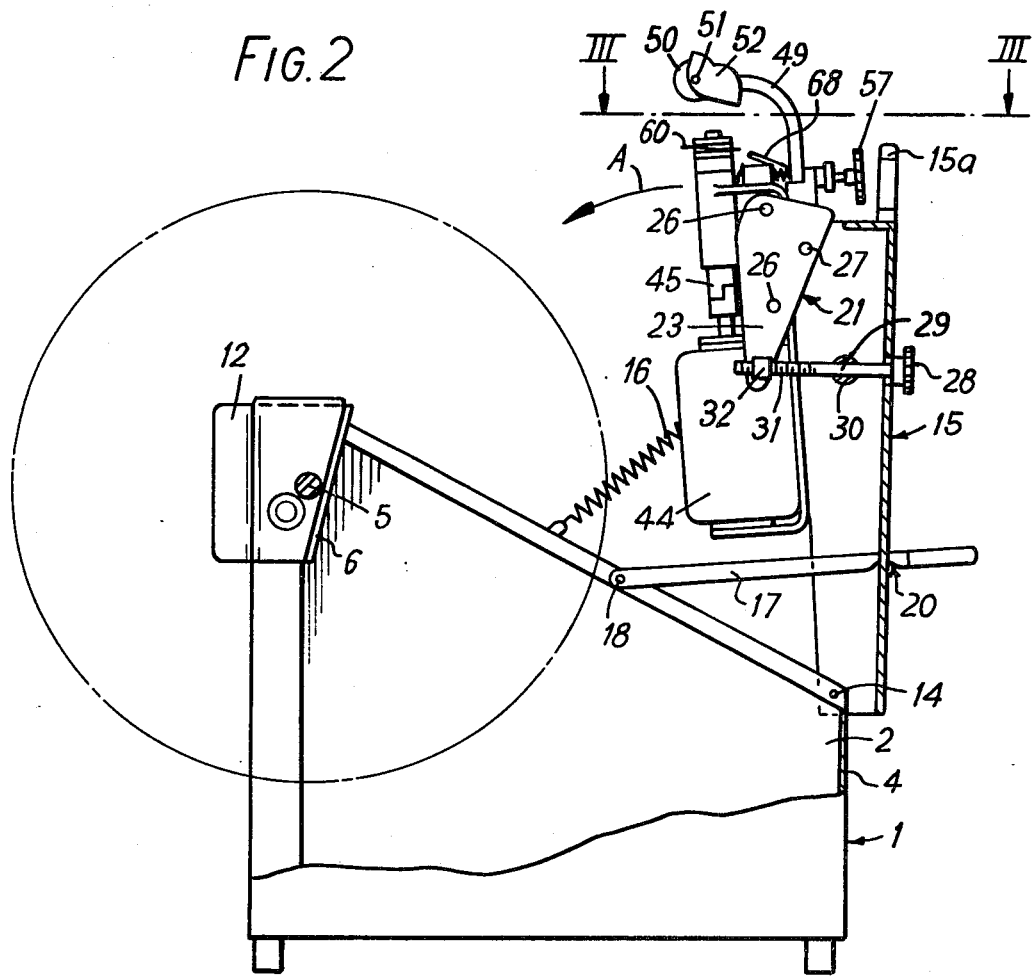
FIG. 2 is a central longitudinal section, with parts shown broken away to reveal internal details.
Figure 3:
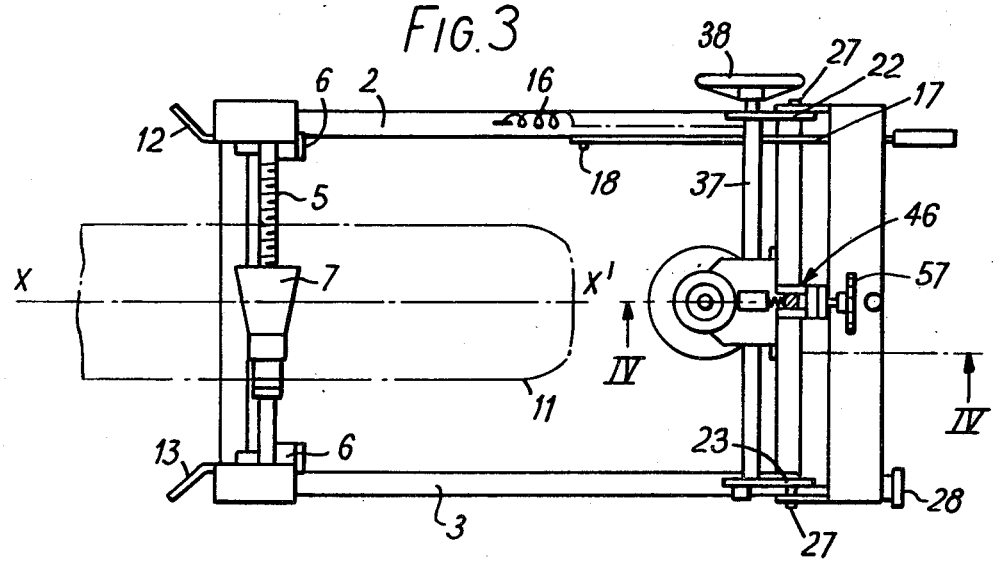
FIG. 3 is a horizontal section taken at the line III—III of FIG. 2.

On the support, adjacent the upper end of the front wall 4, there is provided on each side wall 2, 3, a pivot 14 carrying a mounting indicated generally by reference numeral 15. A spring 16 is connected at one end to the side wall 2 and at the other end to the mounting 15 to urge the mounting in the direction of the arrow "A" in FIG. 2. The mounting may be releasably latched in a non-operative position, seen in FIG. 2, by means of a latching lever 17, pivoted on the side wall 2 at 18 and protruding through an opening 19 in the mounting 15, the lever 17 having a notch 20 in which the wall of the mounting 15 can be retained. When the lever 17 is raised manually, the wall of the mounting is disengaged from the notch 20 and the mounting 15 is then moved by the spring 16 in the direction of the arrow "A".

On the mounting 15 there is carried a guide frame assembly denoted generally by reference numeral 21. The guide frame assembly comprises a pair of side plates 22, 23 which are rigidly connected in spaced parallel relationship by an upper slide tube 24 and a lower slide tube 25 which are secured to the side plates by bolts 26. The frame assembly as a whole is mounted on the mounting 15 by a respective pivot 27 at each side engaged through the side plate and a side wall portion of the mounting 15, and can be moved with the aid of a handle 15a. The frame assembly can be adjusted, about the axis of the pivots 27, to a desired angle by means of a handwheel 28 on a shaft 29 rotatable in a bearing 30 on the mounting 15 and having a threaded end portion 31 on which is threaded a sleeve 32 pivoted on the side plate 23.

Figure 4:
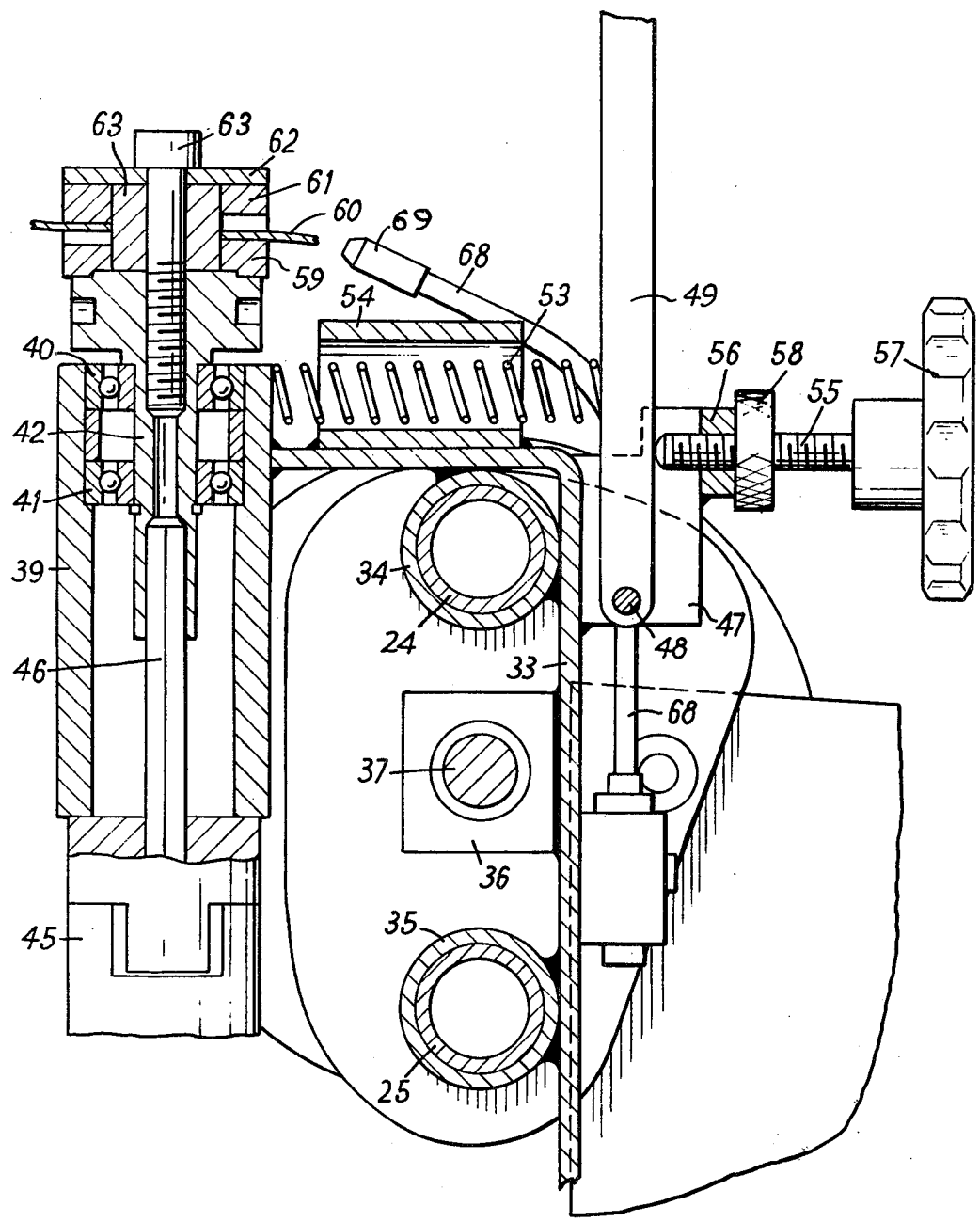
FIG. 4 is a scrap vertical section taken on the line IV—IV of FIG. 3.

On the upper and lower slide tubes 24, 25 there is carried an assembly of a rotary siping cutter, an electrical driving motor for the cutter, and an adjustable feeler for controlling depth of penetration of the cutter into the tire tread. Referring to FIG. 4, this assembly includes a bracket 33 on which are welded sleeves 34, 35 which respectively slide on the upper and lower slide tubes 24, and 25. For shifting the assembly along the slide tubes there is provided a block 36 which is secured to the bracket 33 and which is internally threaded and is engaged on a threaded lead screw 37 journalled in the side plates 22, 23 of the mounting 15. The lead screw 37 can be rotated manually by means of an external handwheel 38.

On the upper part of the bracket 33 there is welded a sleeve 39 having ball races 40, 41 for a cutter shaft 42 carrying a cutter 43 which will be described hereinbelow in greater detail with reference to FIG. 6. The lower part of the bracket 33 has secured thereon an electric motor 44 coupled through a dog clutch 45 to a shaft 46 secured in the cutter shaft 42.

On the guide frame assembly 21 there is mounted a feeler assembly which includes a block 47 welded on the bracket 33, a pivot 48 in the block 47, an arm 49 carried by the pivot 48, and a feeler roller 50 mounted on the free end of the feeler arm 49 and freely rotatable about a pivot 51 secured in a housing 52. The arm 49 is under the action of a thrust spring 53 disposed in a sleeve 54 on the bracket 33 and which bears at one end against the arm 49 and at the other end against the sleeve 39. The relative position of the feeler arm 49 with respect to the bracket 33 is adjustable by means of a threaded shaft 55 threaded through a nut 56 welded on the block 47 and rotatable by a handwheel 57. A knurled nut 58 is provided for locking the shaft in a selected position of adjustment.

Referring now to FIG. 6, the rotatable cutter has the cutter shaft 42, a lower clamping block 59 to seat on the shaft 42, a helical cutter blade 60, an upper clamping block 61, a washer 62, a centering sleeve 63 to seat within the two blocks and the blade, and a securing screw 64 to engage into a threaded bore 65 in the shaft 42. The blade is helical and accordingly one end 60a is axially offset from the other end 60b, the two blocks 59 and 61 being appropriately cut away to conform to the shaping of the blade.

The operation of the tire siping machine is as follows:

A vehicle wheel with its tire is mounted on the shaft 5 and is adjusted so that its center line X-X' is substantially central in the support 1. With the mounting 15 in the non-operative position of FIG. 2, the handwheel 38 is rotated to shift the cutter assembly laterally until the axis of the cutter blade 60 is aligned with a first one of the usual several sections of tread which occur taken across the tire in order.

Then the latching lever 17 is released to permit the cutter to rest stationarily against the tire tread. The handwheel 28 is then rotated to adjust the position of the guide frame assembly 21 so as to place the axis of rotation of the cutter blade 60 at a true tangential position in relation to the circumference of the tire tread section. The handwheel 57 is then rotated to adjust the feeler arm 49 so that, with the feeler roller 50 resting firmly against the respective section of tread, the cutter blade will be tending to penetrate by a requisite amount into the tread section. In other words, adjustment of the handwheel 57 adjust the radial depth of cut. The motor 44 is then switched on to cause the cutter blade to rotate and cut the tread section. Due to the helical nature of the cutter blade, at each time of rotation it pulls the tire around by a circumferential increment of movement corresponding to the degree of axial offset of the two edges of the cutter blade. Accordingly, as cutting proceeds, the tire rotates until the entire tread section has been cut. The motor is then switched off, and the handwheel 38 is operated to move the cutter assembly laterally until the cutter is aligned with the next tread section, again with adjustment of the tangential position and the cutting depth if desired. The motor is again energised to rotate the cutter and cut the section of tread. These operations are repeated until all the sections of tread have been cut. When the last section of tread has been cut, the motor is switched off, and the mounting 15 is pulled manually back to the nonoperative position and is latched therein by the lever 17. The wheel and tire are removed, and a fresh wheel and tire can be inserted.

The feeler wheel 50 rides on the external surface of the tread section. As an alternative to this arrangement, the feeler wheel 50 may be replaced by a feeler finger 66 (see FIG. 5) which is adapted to ride on the surface of the tire in the usual circumferential gap between two adjacent sections of tread. This finger is mounted by a pivot 67 on the end of the modified feeler arm 49a.

The term "siping" as used herein is to indicate the formation of a shallow cut or slash laterally of the tread and a satisfactory siping of a tire is accomplished by forming about eight shallow slashes to the running inch, for example, in a tread section completely across the tread, but at a depth in the tread so that the cuts are almost invisible unless said tread is flexed.

When siped tires are used on a vehicle running on a dry road, the narrow rubber ribs of the tread between the siper slashes therein easily buckle and flex over sharp bumps and pits with less strain on the tire sidewalls so that the tire carcass life is extended. When the siped tires are used on ice or rain-slick roads, the tread bends at each tiny slash formed by the siping, forming a saw-toothed surface or squeegee-edged rubber ribs, which gives instant traction.

Also a siped tire resists skidding and jack knifing on fast stops of the vehicle as each rubber rib of the cross-cut tread bends back and its squeegee-shaped edge grabs the road.

A pipe 68 is mounted on the bracket 33 and has a jet nozzle 69 adjacent the cutter blade for supplying a lubricating liquid to the cutter. An inlet conduit union 70 for the liquid supply is provided on the support.

I claim:
1. A tire tread siping machine which comprises:
   (i) a support
   (ii) means on said support for supporting a tire in upright position and rotatable about its axis
   (iii) a mounting pivotally connected to said support and movable towards and away from said tire support means
   (iv) a guide carried in said mounting and adjustable with respect thereto about an axis parallel to the tire axis, and
   (v) a siping cutter assembly movable along said guide transversely of said support, said assembly including a rotatable siping cutter and a feeler to contact a tread section of the tire.

2. A tire tread siping machine, as claimed in claim 1, further including means for moving said cutter assembly transversely of said support, said moving means comprising a lead screw journalled in said mounting, and a threaded follower engaged on said lead screw and secured to said cutter assembly.

3. A tire tread siping machine, as claimed in claim 1, further including means for adjusting said guide with respect to said mounting, said adjusting means comprising a crank on said guide, a threaded rod journalled on said mounting, and a threaded sleeve secured on said crank and threaded on said rod.

4. A tire siping machine, as claimed in claim 1, wherein said cutter assembly includes a member carrying said cutter, a feeler arm mounted by means of a pivot on said member, said feeler arm having said feeler at the free end thereof, and means for adjusting the feeler arm about said pivot with respect to said member.

5. A tire siping machine, as claimed in claim 4, wherein said adjusting means comprise a shaft threaded in said member and abutting at an end against said feeler arm, and spring means abutting said member and said feeler arm to urge said feeler arm against said shaft end.

6. A tire siping machine, as claimed in claim 1, including means on said support for releasably latching said mounting in a non-operative position.

7. A tire siping machine, as claimed in claim 1, wherein said siping cutter assembly includes a drive motor having a drive shaft connected to said siping cutter.

8. A tire siping machine, as claimed in claim 1, wherein said feeler is a rotary member journalled on a feeler arm and adapted to roll on the outer surface of a tread section.

9. A tire siping machine, as claimed in claim 1, wherein said feeler is a finger adapted to slide on a surface of the tire in a channel between two adjacent tread sections of the tire.

* * * * *